United States Patent
Esslinger et al.

[15] 3,662,811
[45] May 16, 1972

[54] METHOD OF CASTING BY CATCHING FREE-FALLING MOLTEN METAL MASS

[72] Inventors: Paul Esslinger, Frankfurt am Main; Rudolf Walkling, Frankfurt am Main-Bockenheim, both of Germany

[73] Assignee: The Battelle Development Corporation, Columbus, Ohio

[22] Filed: June 30, 1969

[21] Appl. No.: 837,726

[30] Foreign Application Priority Data

July 3, 1968  Germany .....................P 17 58 596.5

[52] U.S. Cl. ..................................164/113, 164/136, 65/123
[51] Int. Cl. ....................................B22d 27/10, B22d 35/00
[58] Field of Search....................164/51, 113, 120, 136, 155, 164/157, 284, 319, 337; 65/123

[56] References Cited

UNITED STATES PATENTS

| 2,686,864 | 8/1964 | Wroughton et al. | 164/251 X |
| 3,240,582 | 3/1966 | Stutske | 65/123 X |
| 3,435,880 | 4/1969 | Goetz et al. | 164/155 |

*Primary Examiner*—R. Spencer Annear
*Attorney*—Arthur O. Klein

[57] ABSTRACT

Manufacturing cutting tools from rapidly solidifying alloys in which the molten alloy mass is rapidly transferred between a pair of operating movable mold means which are provided with suitable recesses for forming said molten alloy mass into the desired shape. The pair of mold means are adapted to rapidly cool the molten alloy mass while it is being shaped.

4 Claims, 1 Drawing Figure

PATENTED MAY 16 1972        3,662,811
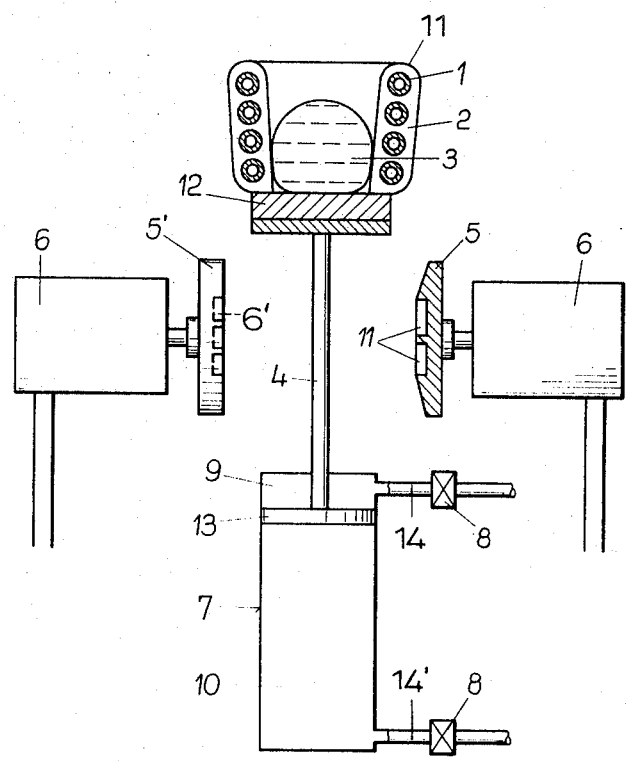
Inventor
Paul ESSLINGER
and Rudolf WALKLING
Arthur O. Klein
their attorney

METHOD OF CASTING BY CATCHING FREE-FALLING MOLTEN METAL MASS

BACKGROUND OF THE INVENTION

The cutting knives of cutting and machining tools have generally the shape of plates. These plates are made of sintered hard metal alloys which have a very high ability to maintain their cutting power and have generally also great wear resistance. Such cutting tools are shaped as plates and have a welded layer of sintered hard metal alloys. It is also known to manufacture such cutting tools by spraying a powder consisting of the alloyed metal which is then heated to a sintering temperature and is then sintered. Due to spraying the alloyed metal in powder form it is rapidly cooled after having been heated to the sintering temperature which gives the eventually resulting cutting tool some very favorable characteristics; for example, a very fine and uniform dispersion of the carbides. Due to the latter the wear resistance and the mechanical characteristics of the surface of the cutting knife are improved.

Thus the rapid cooling which results by manufacturing the cutting tool out of powdered particles consisting of the alloyed metal and spraying said powdered particles so as to obtain the cutting tool constitutes an important advantage in the manufacturing of such cutting tools. However, such a manufacturing technique is also accompanied with certain disadvantages. For example, the costs of manufacturing such cutting tools are relatively high. The advantages which follow a rapid cooling of an alloy melt are partially eliminated by the fact that the sintering process utilized for manufacturing the cutting tools requires some relatively high temperatures.

SUMMARY OF THE INVENTION

It is accordingly a principal object of the invention to manufacture a cutting tool without using a sintering process.

It is a more specific object of this invention to provide an apparatus in a process for manufacturing cutting tools wherein a molten mass of alloy metal is rapidly moved between a pair of mold means which are provided with recesses for shaping the molten mass into a cutting tool and which are adapted to rapidly cool the molten mass of alloy metal.

DESCRIPTION OF DRAWING

The invention is illustrated by way of example in the accompanying drawing which forms part of this application and in which the sole FIGURE illustrates schematically in an elevational view the arrangement of this invention.

DESCRIPTION OF PREFERRED EMBODIMENT

The example of the invention which is illustrated in FIG. 1 includes a crucible or pot 11 having a movable bottom 12. This movable bottom may, for example, be mounted on piston rod 4 having a piston head 13 which is reciprocally mounted in a piston cylinder 7. The crucible 1 contains an alloy mass 3 from which cutting plates, knives, or tools can be fabricated. When the alloy mass 3 has reached a sufficiently high temperature, so that it is in a molten state, the bottom 12 is quickly moved downwardly by means of the piston-cylinder arrangement as will be set forth in detail hereinbelow.

The molten alloy is, for example, heated by means of an inductive coil which is connected to a not illustrated electric power source. The coil 1 is mounted in a protective layer 2 of suitable material such as, for example, asbestos.

It is important that the flat bottom 12 moves downwardly at a velocity which is somewhat slower than the free-fall velocity of the molten mass 3 so that the latter remains as a closely formed compact mass which is necessary for advantageously shaping the molten mass. The bottom 12 thus moves the molten mass 3 between a pair of cooling members 5 which consist of material having a high heat conductivity, such as for example, copper or silver. One cooling member 5' of the pair is substantially flat, whereas the other cooling member is shaped as illustrated in the drawing. Once the molten mass 3 has reached the position between the cooling members 5 the descending velocity of the flat bottom 12 increases, by virtue of the action of the piston-cylinder arrangement, so that the bottom 12 moves ahead of the descending mass 3. The descending velocity of the bottom 12 is such that the bottom 12 has reached a position immediately below the lower peripheral region of the transversely moving cooling members 5 when the descending molten mass 3 has reached a substantially central position between the pair of cooling members 5. The pair of cooling members 5 are then rapidly moved together thereby "catching" the molten alloy mass 3 and subjecting it to an intensive cooling process, whereby the molten mass 3 is shaped into a flat cutting tool. The final shape of the cutting tool is defined by the configuration of the recess or recesses 11 in one of the cooling members 5. Since this cooling member has the shape of a truncated cone the removal of excess molten metal is assured.

The pair of cooling members 5 may also be so shaped that they both have a plurality of recesses 6'. It is, of course, also possible to provide only one cooling member 5 with one recess 11, whereas the other cooling member is provided with a corresponding projection; so that when the pair of cooling members 5 have completely moved together they define a free space between themselves. This free space then determines the final shape of the cutting plate.

It is also possible to shape the pair of cooling members 5 in such a way that one cooling member is provided with a plurality of recesses 6' whereas the other cooling member is provided with a plurality of projections, so that the pair of cooling members when taken together, form an arrangement similar to that of a waffle iron. With such an arrangement it is possible to produce a plurality of cutting plates in one cooling operation.

The recesses and projections of the cooling members are so dimensioned that they adapt themselves to the molten alloy mass as it shrinks during the cooling process while the pair of cooling members 5 are subjected to a continuous pressure, thereby providing a continuous cooling of the alloy mass.

The complicated movement of the flat bottom 12 is effected pneumatically as follows:

The bottom 12 is connected to a piston rod 4 which terminates in a piston head 13. The latter is slidably reciprocally movably mounted in a cylinder 7 and divides the latter in two chambers 9 and 10 the volumes of which vary as the piston head 13 moves in the cylinder 7. The pipes 14, 14' are respectively connected to the chambers 9 and 10, on the one hand, and to a not illustrated pneumatic power source, on the other hand. The pipes 14, 14' are provided with adjustable air flow regulating valves 8. By adjusting the valves 8 according to a predetermined scheme the pressures in the chambers 9 and 10 vary in such a way that the bottom plate 12 moves in the aforedescribed manner.

In the illustrated embodiment the cooling members 5 are actuated by means of a pair of solenoids 6. The solenoids 6 are provided with non-illustrated pneumatic switches which actuate the solenoids at a predetermined point in time in the operative cycle of the arrangement. This point in time is determined by the fact that cooling members 5 can only move together after the bottom plate 12 has descended below the lower peripheries of the cooling members.

The alloy metal mass 3 can also be molten in alternate ways. For example, the mass 3 can be heated in a tube, consisting of graphite or other ceramic material, the bottom of which forms the support surface for the mass 3. The tube can be heated by means of an induction coil or an electric resistance wire arrangement. Thus the mass can be heated to its melting temperature in many different ways. What is important is that the molten mass retains a compact form while descending between the pair of cooling members 5. It is particularly important to avoid that a thin or thick thread of molten metal flows downwardly between the pair of cooling members. It is also important to move the molten mass 3 as quickly as possible between the cooling members 5.

Thus, by means of the process of the invention it is possible to fabricate by means of the afore-described one step of operation directly a practically finished cooled molten mass which forms compact cutting plates, the form of which can be practically varied a limitless number of ways. For practical reasons, however, the maximum dimensions of the cutting plates should not exceed 20 × 20 × 5 mm³. The alloy metal mass may consist, for example, of the usual components of high-speed steels. In particular the following compositions have been found to be suitable:

| Percent | | | | | |
|---|---|---|---|---|---|
| 0.8 C | 4.5 Cr | 6 W | 5 Mo | 5 V | Remainder iron. |
| 1.2 C | 4.5 Cr | 11 W | 5 Mo | 3 V, 1 Co | Do. |
| 1.5 C | 4.2 Cr | 6.5 W | 5 Mo | 3.2 V, 4.8 Co | Do. |
| 1.5 C | 4.5 Cr | 12 W | 1 Mo | 4 V, 5 Co | Do. |
| 1.6 C | 4.5 Cr | 12.5 W | 1 Mo | 4 V | Do. |
| Stellite | 2.5 C | 31 Cr | 31 Cr | 17 W | Do. |

Furthermore, alloys having ingredients based on the aforementioned compositions with a high content of carbon and/or vanadium are also suitable for the manufacture of cutting plates in accordance with the process of this invention.

The last mentioned compositions, if subjected to the conventionally known processes, exhibit a correspondingly high wear resistance and therewith a high ability to retain or maintain their cutting power because the compositions themselves are quite brittle. Such compositions are particularly suitable for the process of this invention because, as a result of the rapid cooling and solidification, the molten mass solidifies in a refined state thereby eliminating the globules present in the molten mass and resulting in a better distribution of the carbides. The process of this invention is therefore capable of producing a cutting plate having a higher toughness which can only normally be obtained with metal alloys having a substantially lower carbide content.

The cutting plates manufactured in accordance with this invention can be mounted by conventional means onto a shaft or a tool consisting of a cheap material such as for example by means of threading the cutting plate onto the shaft or welding it onto the shaft.

In order to obtain the afore-recited advantageous characteristics the cutting plates manufactured in accordance with this invention must be subjected to a cooling of at least $10^3$ °C./sec. This cooling rate can be obtained by means of the apparatus discussed herein without any difficulty.

Although the invention is illustrated and described with reference to one preferred embodiment thereof, it is to be expressly understood that it is in no way limited to the disclosure of such a preferred embodiment, but is capable of numerous modifications within the scope of the appended claims.

We claim:

1. A process for manufacturing cutting tools and the like out of quickly solidifying alloys, comprising the steps of
   supporting a metal alloy at a first level on a supporting means while heating a metal alloy so that it forms a molten mass on said first level;
   descending said molten mass by said supporting means at a first velocity less than the free fall velocity of said molten mass to a second level between a pair of operatively movable cooling members;
   said supporting means descending at a velocity larger than the free fall velocity of said molten mass after the latter has reached said second level; catching said molten mass at said second level by means of said movable cooling members which quickly cool and shape said molten mass.

2. The process as set forth in claim 1, wherein said pair of cooling members are shaped as a pair of opposite plates, at least one plate of the pair of plates having recess means for shaping the cutting tool while subjecting it to cooling.

3. The process as set forth in claim 2, wherein said metal alloy consists of 0.8 percent to 2.5 percent C, 4.5 percent to 31 percent Cr, 6 percent to 17 percent W, 1 percent to 5 percent Mo, 3 percent to 5 percent V, 4.8 percent to 43 percent Co and the balance iron.

4. The process as set forth in claim 2, wherein said cutting tool is shaped as a plate having the following maximum dimensions: 20 × 20 × 5 mm³.

* * * * *

Dedication 3,662,811.— *Paul Esslinger*, Frankfurt am Main, and *Rudolf Walkling*, Frankfurt am Main-Bockenheim, Germany. METHOD OF CASTING BY CATCHING FREE-FALLING MOLTEN METAL MASS. Patent dated May 16, 1972. Dedication filed Aug. 2, 1974, by the assignee, *The Battelle Development Corporation*.

Hereby dedicates to the People of the United States the entire remaining term of said patent.

[*Official Gazette November 12, 1974.*]